Feb. 8, 1966   G. KAESS ET AL   3,233,958
MOTION PICTURE SOUND PROJECTOR
Filed Oct. 24, 1962   7 Sheets-Sheet 1

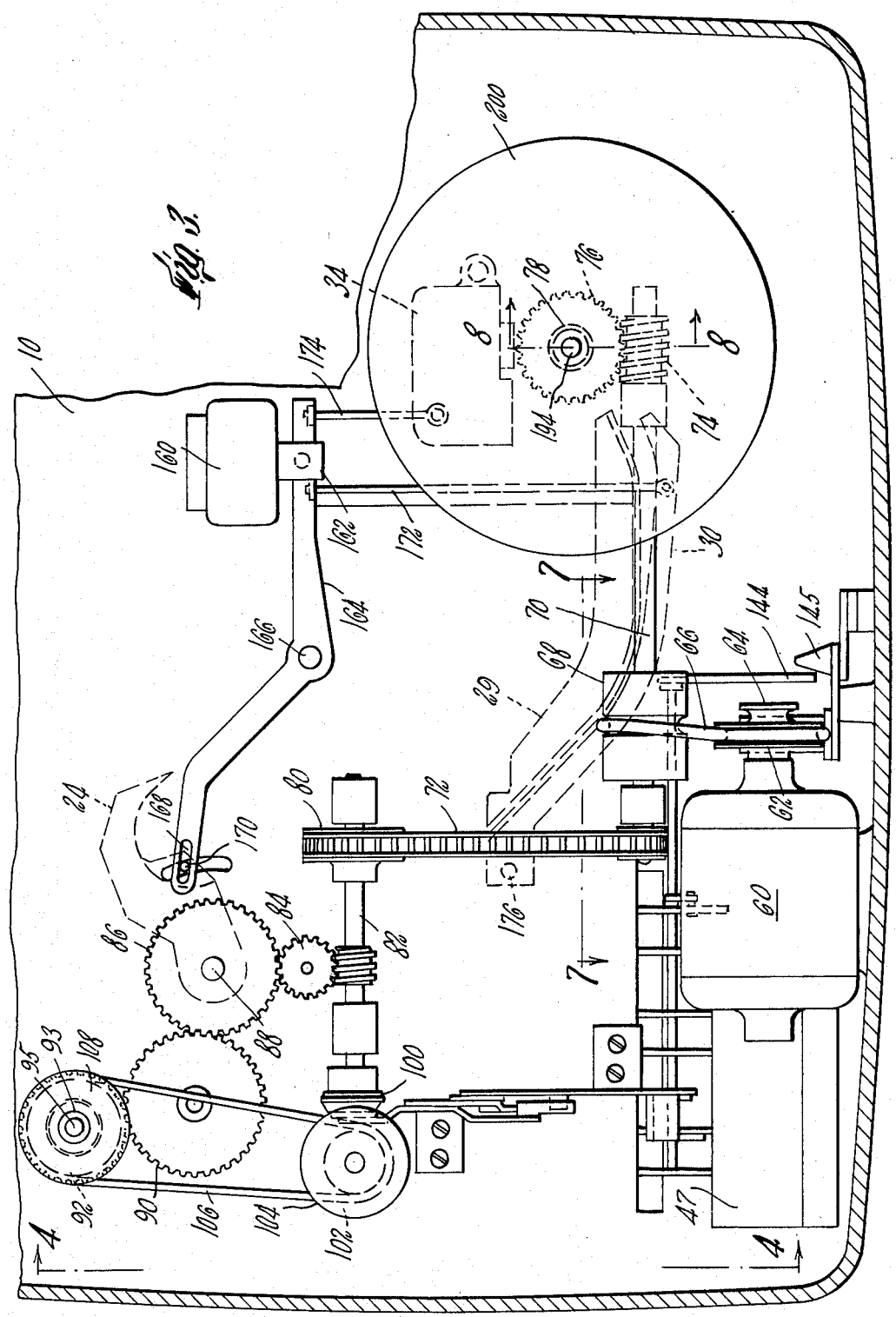

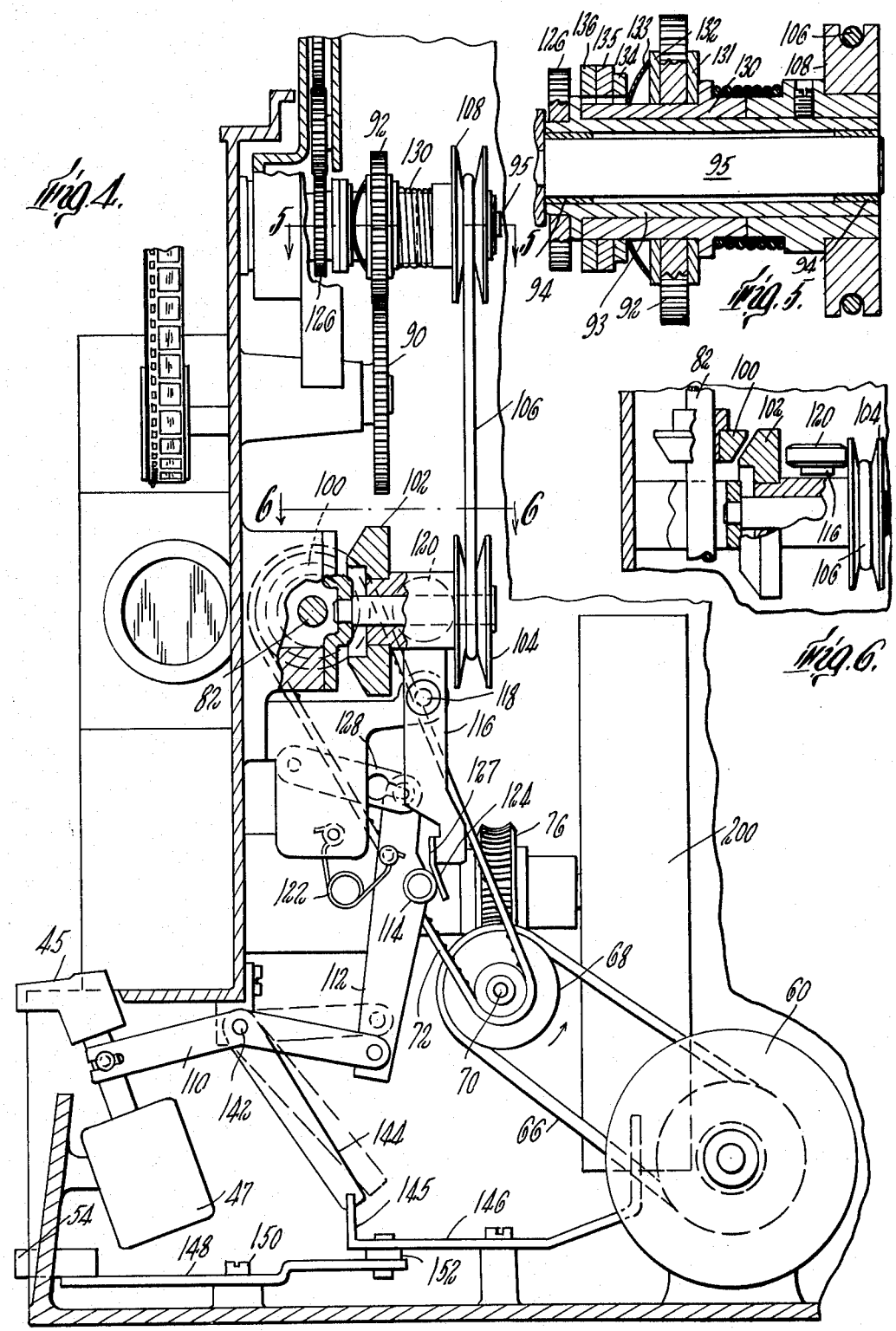

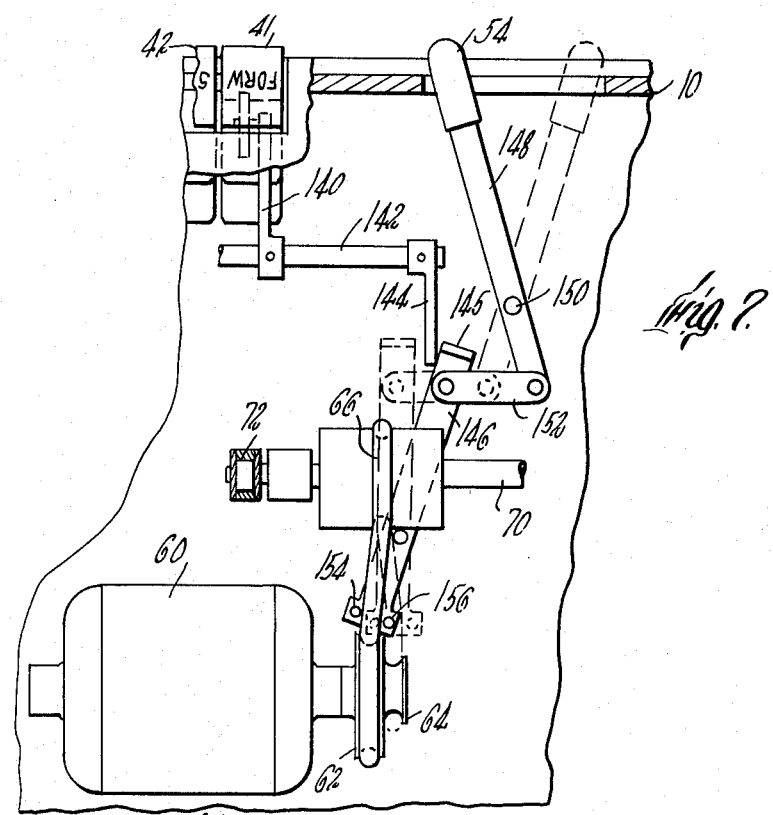
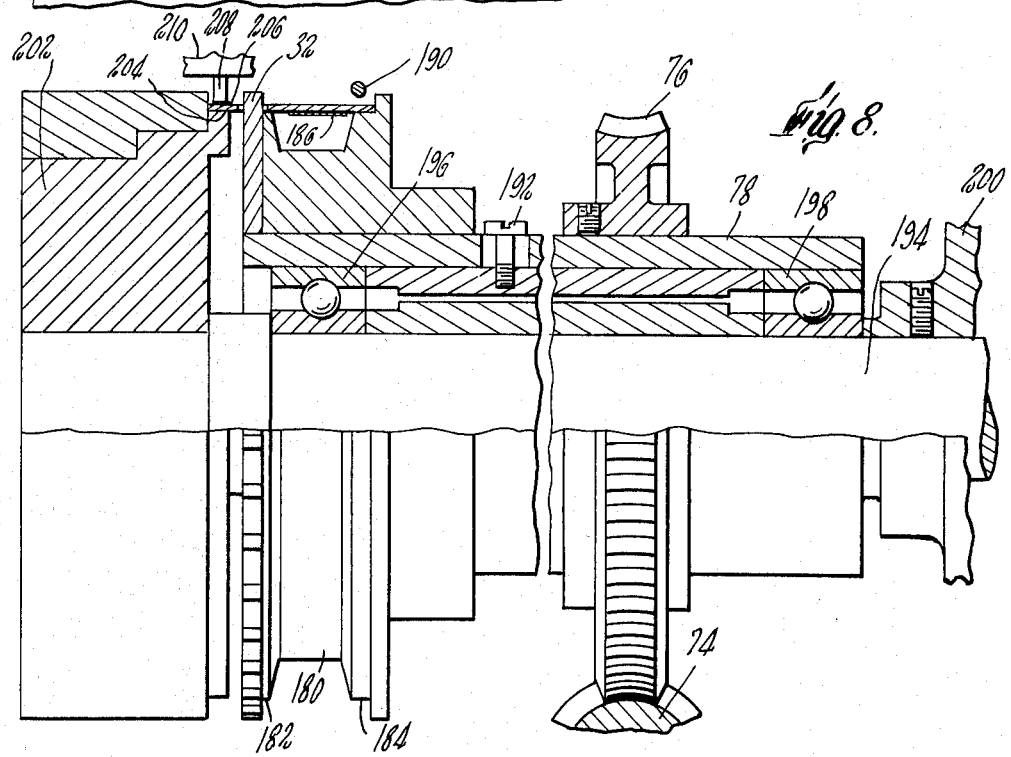

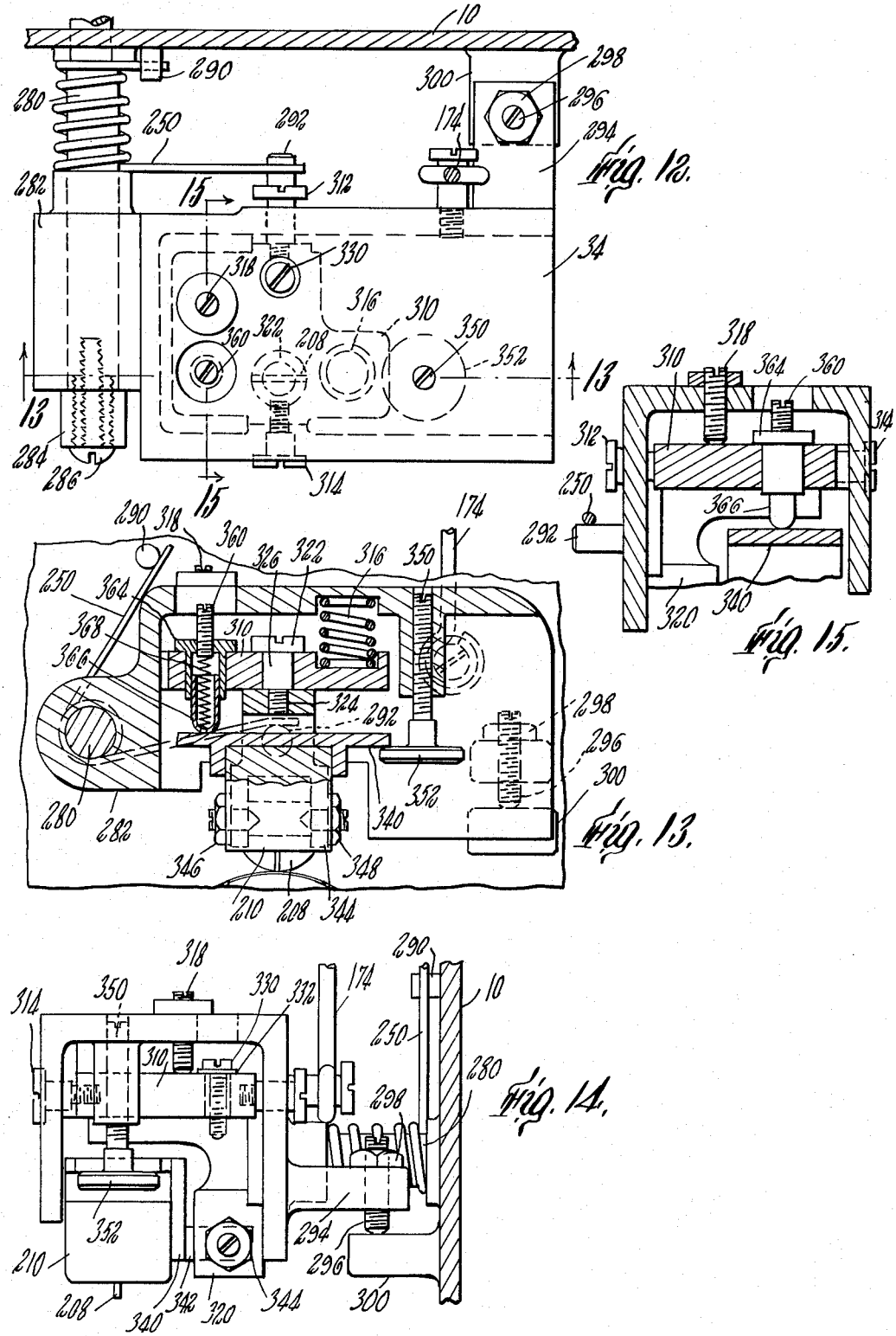

United States Patent Office 3,233,958
Patented Feb. 8, 1966

3,233,958
MOTION PICTURE SOUND PROJECTOR
Gary Kaess, Boston, and Robert G. Palmer, Quincy, Mass., assignors to Keystone Camera Company, Inc., Boston, Mass., a corporation of Massachusetts
Filed Oct. 24, 1962, Ser. No. 232,712
12 Claims. (Cl. 352—30)

This invention relates to motion picture projectors and more particularly to projector apparatus of the sound type.

Motion picture sound projector apparatus must be carefully engineered so that the reproduced sound is properly synchronized with the projected picture images. This requirement dictates a precise spacing between the location of the image aperture of the projector and the sound head which has been standardized in the industry. Additional complexity is introduced, however, due to the fact that the film must be stepped past the image aperture in an intermittent manner while for proper sound reproduction it is essential that the sound stripe on the film move past the sound head at a constant speed. It is necessary to isolate these two distinct film movements from one another and for that purpose a number of relatively complex filtering or isolation arrangements have been devised and utilized. While such filtering arrangements provide satisfactory isolation, they involve intricate film paths which make threading of film through the projection apparatus difficult. Such film paths present particular problems in "self-threading" projector apparatus in which the film is threaded through the projector by a single drive sprocket. Particularly in projectors of the type operated by the non-professional there is demand for simple, trouble-free, easily operated apparatus of this type which is relatively inexpensive in cost.

Accordingly, it is an object of this invention to provide a novel and improved motion picture projector of the sound type which facilitates "self-threading."

In the recording of sound on motion picture film a sound stripe of magnetic material is often employed, which sound stripe is magnetized in accordance with the sound that is to be recorded. This sound stripe is moved past a sensing head at uniform speed and the recorded flux patterns are sensed by the pole piece and converted to electrical signals which are in turn converted to audible signals in the form of the desired sounds. In order that the sound be properly reproduced the pole piece of the sensing head must be accurately aligned relative to the sound stripe so that the desired signal coupling be achieved. Suitable sound head design for use with film of the eight-millimeter size must satisfy the available space requirements as well as being compatible with the image reproduction apparatus of the projector.

Accordingly, it is a further object of this invention to provide a novel and improved sound head structure for sensing magnetic flux patterns recorded on a stripe of magnetic material.

A further object of the invention is to provide a novel and improved sound head structure which facilitates the positioning of the sound head in optimum relation to the film sound track in a motion picture projector.

Another object of the invention is to provide a novel and improved motion picture sound projector in which the film sensing facilities for sound reproduction are inexpensive to manufacture while capable of producing sound of high quality.

Another object of this invention is to provide a novel and improved motion picture sound projector of the eight-millimeter size.

Still another object of the invention is to provide an improved motion picture sound projector in which the sound head and a film drive sprocket are mounted coaxially with one another.

Still another object of the invention is to provide a novel and improved motion picture sound projector which employs a simplified film path which facilitates self-threading operations.

Still another object of the invention is to provide a motion picture projector having improved film guide structures which facilitate the threading of film.

A further object of the invention is to provide in a motion picture projector a novel and improved projector control mechanism responsive to the movement of the film therepast.

A further object of the invention is to provide in a motion picture sound projector a novel sound head support structure which enables the sound head to be adjusted in a plurality of dimensions for accurate alignment with the sound drum and film supported thereby.

Other objects, features and advantages of the invention will be seen as the following description of a preferred embodiment thereof progresses, in conjunction with the drawings, in which:

FIG. 3 is a view taken from the rear of the sound projector shown in FIG. 1 showing details of the drive mechanism and control linkages employed therein;

FIG. 4 is a sectional view through the projector case taken along the line 4—4 of FIG. 3 showing further details of the drive and control mechanisms;

FIG. 5 is a sectional view along the line 5—5 of FIG. 4 showing details of the clutch mechanism employed for driving the supply reel;

FIG. 6 is a sectional view taken along the line 6—6 of FIG. 4 showing details of the rewind drive mechanism;

FIG. 7 is a top plan view of the drive mechanism, speed control linkage and interlock employed in the projector apparatus;

FIG. 8 is a sectional view of the drive sprocket and sound head showing the relationship of the film to those elements;

FIG. 12 is a top plan view of the sound head support structure;

FIG. 13 is a sectional view of the sound head structure taken along the line 13—13 of FIG. 12;

FIG. 14 is a side elevational view of the sound head and support structure;

FIG. 15 is a sectional view taken along the line 15—15 of FIG. 12 of the sound head looking in the opposite direction from that of FIG. 14;

Figure 1:
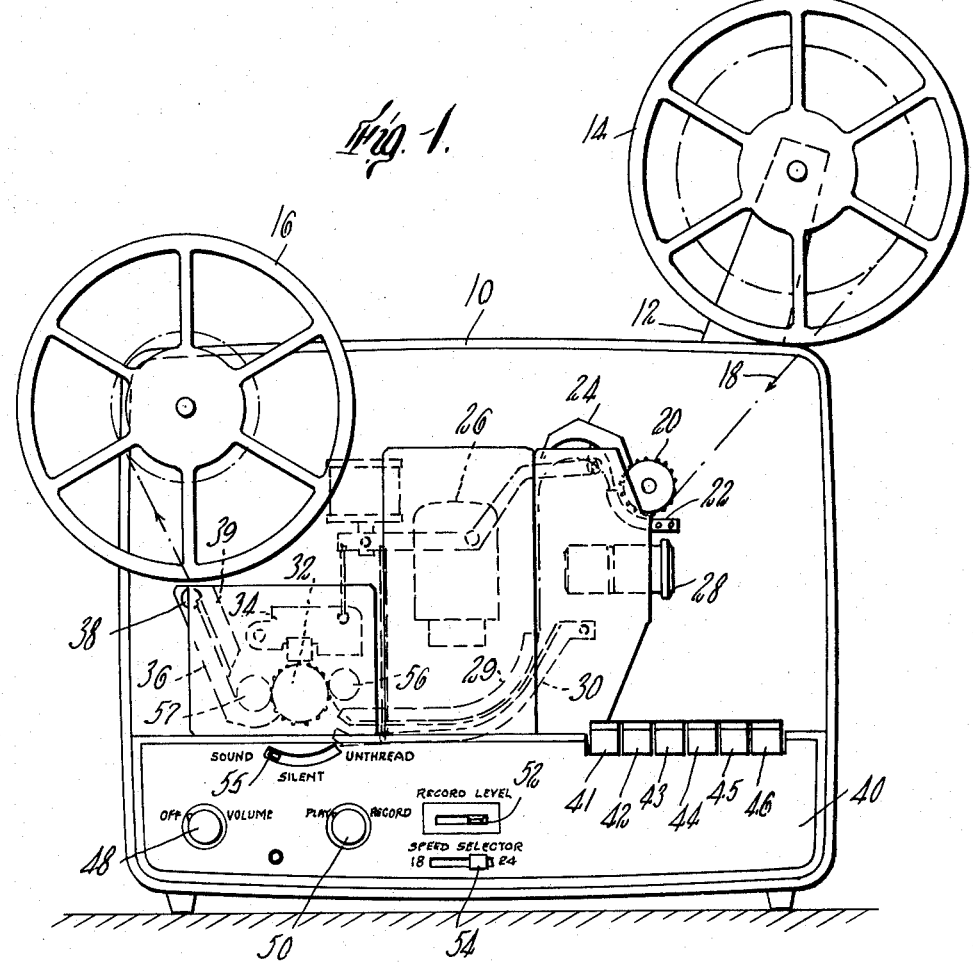
FIG. 1 is a side elevational view of an eight-millimeter sound projection apparatus constructed in accordance with the invention.
Figure 2:
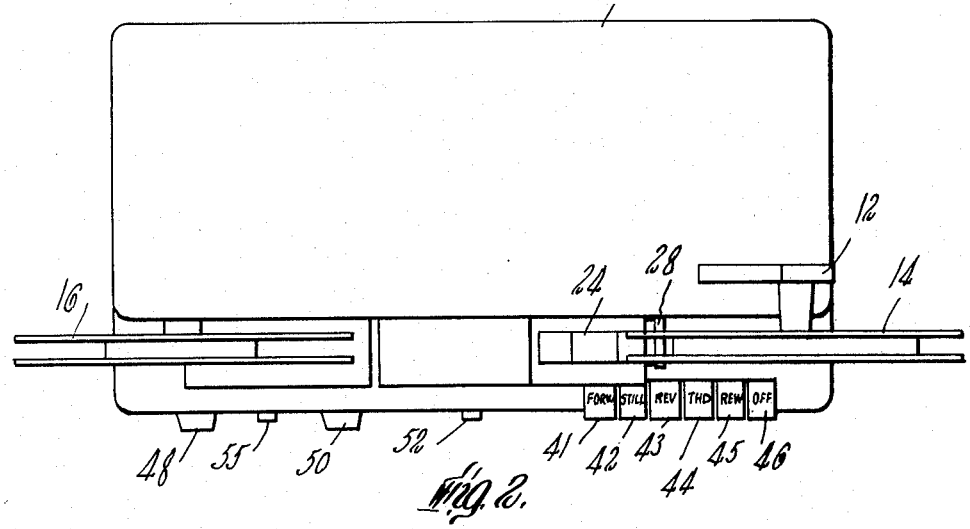
FIG. 2 is a top view of the sound projector apparatus of FIG. 1.

As shown in FIGS. 1 and 2, the sound projector has a casing 10 on which is mounted a suitable support arm 12 on which is positioned a supply reel 14 and at the upper rear corner of the casing front wall, a takeup reel 16. Film 18, indicated by the dashed line, is fed past a first drive sprocket 20 as guided by a fixed guide 22 and then via a movable guide 24 to the projection aperture area disposed between the projection lamp 26 and a lens unit 28. After passing the projection aperture, the film enters a channel provided by a fixed guide 29 and a second movable guide 30 and is fed rearwardly to a second drive sprocket 32 at which position there is also provided a sound drum that is mounted coaxially therewith. Disposed above the sound drum is a sound head structure generally indicated at 34. At the discharge end of the sound drum sprocket there is a third movable guide 36 which is pivoted about point 38 and cooperates with a fixed guide 39 to provide a guiding path for the film to the takeup reel 16.

Several controls are mounted on the lower part of the projector case in the panel 40. These controls include a set of six push buttons 41–46 which control operations as follows:

Push button 41—Forward
Push button 42—Still
Push button 43—Reverse
Push button 44—Thread
Push button 45—Rewind
Push button 46—Off Buttons 41, 43, 44, 45 and 46 operate electrical contacts within switch assembly 47 (FIG. 4.). Button 41 also operates a shifting interlock and button 45 also operates a rewind linkage. Button 42 operates the still picture clutch (a purely mechanical linkage). Further control is provided by knob 48 which has an off position and also controls the sound volume; and knob 50 which controls the recording or playback operation of the sound system. Meter 52 indicates the record level, and directly below that meter is a speed selector lever 54. Lever arm 55 controls the position of the sound head 34, the guide 36 and the two rollers 56, 57 disposed adjacent sprocket 32.

A general understanding of the drive mechanism may be had with reference to FIG. 3. In the projector case there is mounted a motor 60 (on the output shaft of which is mounted a two-step pulley) having diameters 62, 64. A flexible belt 66 is trained over the two-step pulley and over pulley 68 mounted on shaft 70. On one end of the shaft (the left end as viewed in FIG. 3) is a toothed pulley driving a timing belt 72 and on the opposite end of shaft 70 there is mounted a worm gear 74 which engages a helical gear 76 mounted to drive the tubular shaft 78 and sprocket 32.

The timing belt 72 is coupled by a toothed pulley 80 to shutter shaft 82 mounted in suitable bearings for driving the shutter and intermittent claw and through idler 84 to drive gear 86 to which shaft 88 is secured for driving sprocket 20. Gear 86 is connected through a reverse drive gear 90 to a driving gear 92 which is coupled through a one way clutch and a slip clutch to drive shaft 93 and a gear train to rotate the supply reel 14 in the reverse direction. Drive shaft 83 has two bearings 94 pressed in it and rotates on a stud 95 (FIG. 5).

Also shown in FIG. 3 is a high speed rewind drive which includes a friction cone 100 that is mounted on the shutter shaft and which may be engaged with a cooperating conical friction capstan 102. Capstan 102 drives pulley 104 over which a belt 106 is trained for driving pulley 108 (FIG. 4). This overdrive is used for rewind and includes a linkage that is operated by the rewind push button 45. As shown in FIG. 4 there is provided a first link member 110 mounted pivotally at its center on a support secured to the projector frame. One end of link 100 is coupled to push button 45 and the other end of the link member 110 is pinned to link 112 that carries a stud 114 which acts against a third link member 116 that is mounted for pivoting movement about stud 118. At the upper end of link 116 there is provided a roll 120 as best seen in FIG. 6. Roll 120 is movable horizontally between a point in engagement with pulley 104 and a point in engagement with cone 102. When the rewind push button 45 is depressed the linkage is operated to move stud 114 upwardly against the biasing effect of toggle spring 122 against the camming surface 124 to pivot link 116 about its pin 118 and force the cone 102 into engagement with the cone 100 on the shutter shaft 82. When this occurs pulley 108 is driven via belt 106 and pulley 104 and this over-riding force is coupled directly to the output gear 126 that is coupled via the gear train in the supply reel support arm 12 to the supply reel 14. The advantage of this linkage system is that it has no tendency to push button 45 upwards thus breaking the electrical circuit which was established in switch 47 when button 45 was depressed. Absence of pressure on the button is due to the following conditions: stud 114, in the rewind position, is pressing against the straight portion 127 of camming surface 124, and thus there is no component force in the downward direction; and toggle spring 122, in the rewind position, has passed its "center," and tends to push link 112 upwards. When the "off" button 46 is depressed at the end of the rewind operation, sliders inside switch 47 operate to interrupt the electrical circuit and at the same time to push up button 45. These sliders are rather delicate due to the nature of the switch and should not be subjected to heavy forces. The rewind linkage system puts very little strain on the sliders since stud 114 can easily slide down the straight portion 127, and helps link 112 move downwards, thus helping to lift button 45, and move the sliders in the switch. When stud 114 is half-way down the camming surface 124, link 128 limits any further pressure between stud 114 and surface 124. This lets roller 120 move away from cone 102, disengaging the rewind overdrive. Also pulley 108 is further from the center plate than pulley 104, and this misalignment of belt 106 tends to urge cone 102 away from cone 100.

This structure provides a drive through gear 92 in the reverse direction when push button 43 is depressed. However, when the rewind button 45 is depressed the mechanical linkage is operated to drive the pulley 108 at a much higher speed than the gear 92 is being driven and this higher speed is coupled directly and positively to the reel drive even though gear 92 remains driven.

When button 43 is depressed the projector operates in reverse, and sprocket 20 feeds film at a constant rate to reel 14. The effective diameter of reel 14 varies with the amount of film already on the reel. Therefore, reel 14 must rotate at a variable speed. To allow the reel 14 to turn slower as it gets fuller, gear 92 is permitted to slip on sleeve 130 by means of a slip clutch. The slip clutch consists of friction washers 131 and 132 which are keyed to sleeve 130, and spring washer 133 and back-up washer 134, and adjusting nut 135, and locking nut 136. The tension of the clutch is adjusted by compressing spring washer 133 to the desired degree by turning nut 135. In rewind the reverse slip clutch is bypassed, thus providing positive (slip-free) drive to reel 14. Thus this system provides a slow-speed variable-slip drive in reverse and a fast positive drive in rewind, which over-runs the slower reverse drive.

A similar type of slip clutch (not shown) is employed to drive the takeup reel 16 by means of a chain drive from the shaft 83. A similar one way clutch structure is employed there so that the drive is engaged only in the forward direction and is not engaged either at the normal reverse speed or at the higher rewind speed.

An interlock control is indicated in FIGS. 3, 4 and 7. This interlock control is controlled by the forward push button 41 and includes a lever 140 supported on a rotatable bar 142. At the opposite end of the bar there is mounted an arm 144 which in a normal position blocks movement of tab 145 on link 146. That link 146 is a part of the linkage connected to the speed control knob 54. That speed control knob is mounted on a lever 148, pivoted at point 150 and coupled to an intermediate link 152 that connects links 148 and 146.

When the forward push button is depressed, the lock arm 144 is moved out of lock position and clear of upstanding tab 145 to permit the movement of the speed selector switch. Mounted on the opposite end on the link 146 from tab 145 is a pair of parallel upstanding pins 154, 156 which are positioned on either side of belt 66. Movement of the speed selector knob 54 causes the pins to engage belt 66 and move the belt from the larger diameter section 62 of the pulley to the smaller diameter section 64 and back again. In this manner control of the speed between twenty-four frames per second for sound operation and eighteen frames per second for silent operation is operative only when the projector is operating in the "Forward" mode. This prevents damage to the belt and/or stalling of the drive motor, if an attempt to shift was to be made to shift while the projector is in "off," "reverse" or "rewind" condition.

Also shown in FIG. 3 is the guide control mechanism for positioning the self-threading guides 24 and 30 and at the same time the sound head structure 34. During a threading operation guide 24 is down or lowered in loop forming position for guiding film into the projection aperture area to form the desired loop configuration and guide 30 is in a raised position as shown in FIG. 1 to provide a second loop and to guide the end of the film into engagement with the teeth of sprocket 32. At this time the sound head 34 is also raised. When the completion of the threading operation is sensed, a mechanism is actuated to raise guide 24, lower guide 30 and lower the sound head into position for operation. This operation is accomplished by solenoid 160 (shown in FIG. 3) which has an actuating arm 162 secured to a link 164 pivoted at pin 166. The forward end of the link 164 has a slot 168 through which pin 170 protrudes, which pin is secured to the loop forming guide 24. Immediately adjacent the actuating arm of the solenoid are two depending rods 172, 174. Rod 172 is secured to the lower film guide 30 which is pivotally secured to the projector casing by a pin at point 176. The second rod 174 is secured to the support structure for the sound head 34.

The solenoid is energized when the thread push button 44 is depressed and pulls up arm 166 to raise the sound head 34 and intermediate guide 30 and to lower the loop forming guide 24. In that position film fed into engagement with the entrance sprocket 20 is automatically guided by the guide 24 into the projection aperture guide and from there into the intermediate guide 30 with a sufficient loop being formed at each end to provide compensation for the intermittent movement of the film produced by the film advancing claw. The intermediate guide 30 forms a second loop as the film is guided rearwardly into engagement with the sound sprocket 32 and fed from that sprocket to the output guide 36. When the film enters the guide 36 a sensor located there detects the presence of the film and may operate electrical circuitry to de-energize solenoid 160 releasing the guides 24 and 30 and lowering the sound head so that the pole piece of the sound head is in engagement with the sound track on the film. Also this sensor may be used to automatically turn off the room lights and to energize the projection lamp 26 for display of the images on the film. It may also be employed to turn off the projector and turn on the room lamp when the film's end has run through the sound sprocket.

The sound sprocket 32 structure is shown in greater detail in FIG. 8. As there indicated, the sound sprocket and film support structure has a channel 180 with surfaces 182, 184 on either side thereof on which the film is guided without any contact of the emulsion portion 186 therewith. A guide controlling the passage of the film during the threading of the film in engagement with the sprocket teeth is provided by wire 190 which has a curvature corresponding to that of the sprocket structure 32. This wire does not touch the film during normal operation. This drive sprocket structure is mounted on a tubular shaft 78 to which is secured the driving gear 76 by means of set screw 192 or other suitable means. Gear 76 is driven by the worm gear 74 that is mounted on the jack shaft 70. Mounted coaxially with the tubular shaft is a fly wheel shaft 194 which is spaced therefrom by bearings 196, 198 so that the two shafts rotate independently. On the interior end of the fly wheel shaft 194 is mounted a fly wheel 200 of substantial mass and on the exterior end of shaft 194 is secured a sound drum structure 202 which has a depressed surface 204 on which the sound stripe portion 206 of the film is supported, the surface 204 being aligned with the film support surfaces 182, 184 of the sprocket. Sound drum surface 204, which has a slightly greater radius than the sprocket film guide surfaces 182 and 184, thus is free to rotate independently of the sprocket structure and its motion is principally controlled by the fly wheel 200.

The sound drum surface 204 is smoothly polished and the sound track 206 of the film is maintained in frictional engagement with that surface by the pressure of the pole piece 208 of the sound head structure 34 and pressure roller 56. The compliance characteristics of the film material effects decoupling of minor variations in the speed of the film produced for example by changes in the spacing of the sprocket holes due to the shrinkage, aging of the film, etc. This film compliance is sufficient so that with the sound track portion thereof being directly coupled to the mass of the fly wheel its instantaneous speed is independent of the motion of the sprocket teeth and any dimensional changes in the film, which result from age or usage for example, and produce slight differentials in drive speed at the sprocket, do not affect the speed of the sound track. Rather, that portion of the film is driven at a uniform speed past the pole piece 208.

Figure 9:
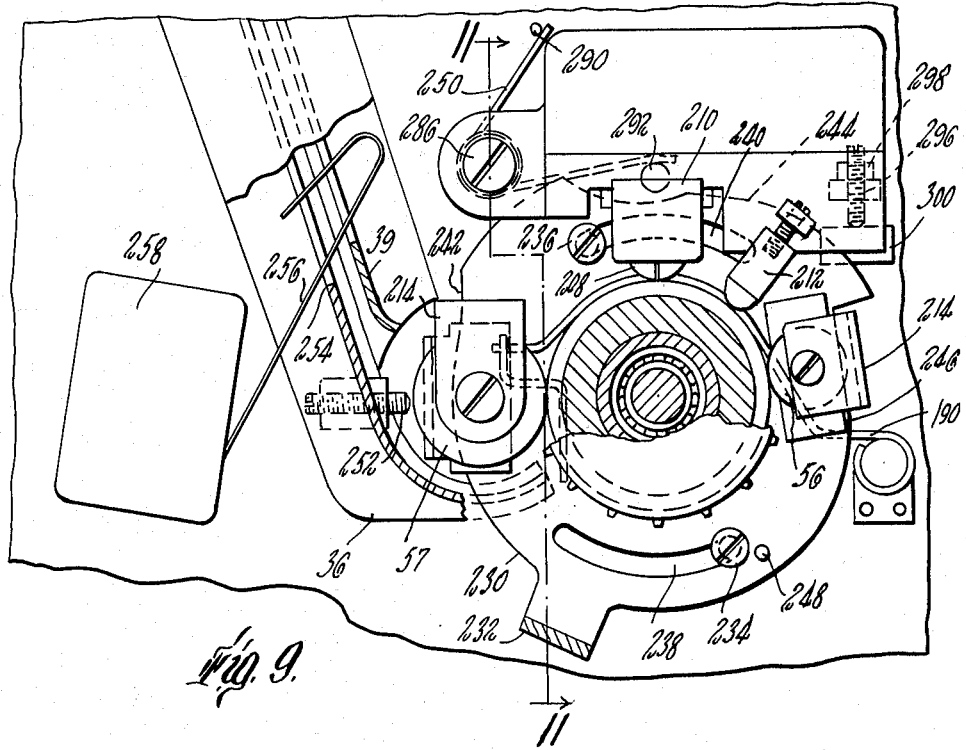
FIG. 9 is a sectional view of details of the sound head support mechanism and associated structure adjacent to the sound drum.
Figures 10, 11:
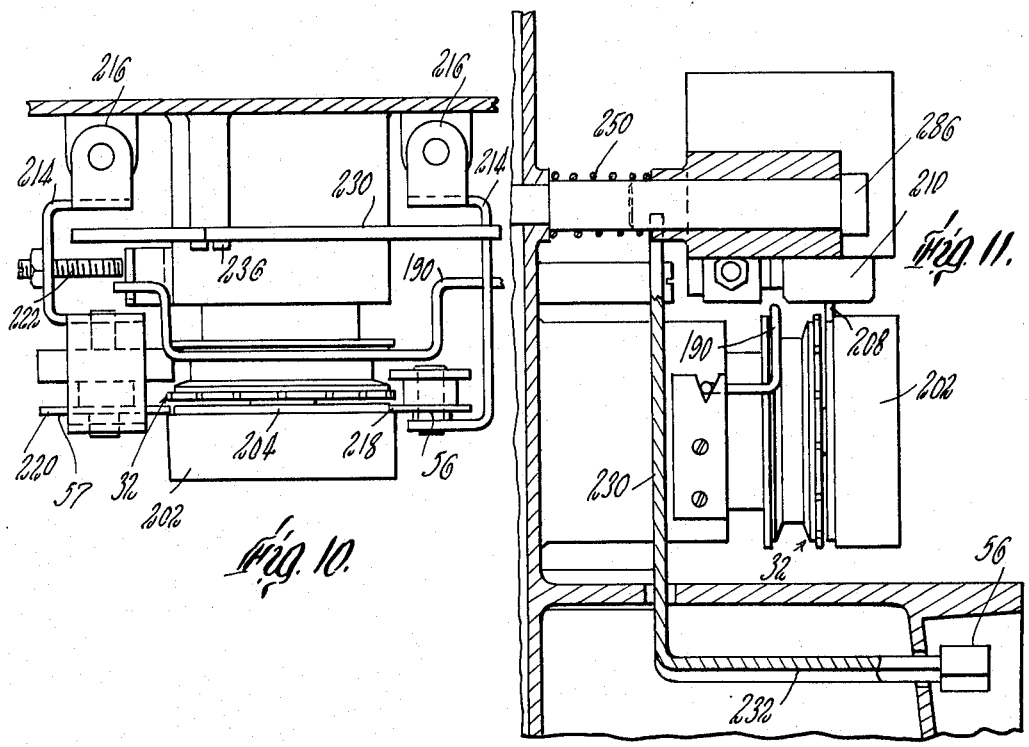
FIG. 10 is a plan view of the sound drum and drive sprocket structure with the sound head mount removed.
FIG. 11 is a sectional view along the line 11—11 of FIG. 9 showing additional details of the sound drum and sound head mounting.

More detailed views of the sound sprocket structure are shown in FIGS. 9–11. Immediately forward of the pole piece 208 of the record-playback-head 210 is an erase head 212. The erase head 212 is pivotally mounted on the support structure 34 for adjustment toward and away from the sound drum. It is spring-loaded against the drum and has adjustments for tangency and azimuth. A first pressure roller 56 is biased against the forward side of the film sprocket surface and a second pressure roller 57 is biased against its rear surface. Each of these rollers is pivotally mounted on brackets 214 (FIG. 10) which are mounted for pivoting movement in clevis arrangements 216 supported on the wall of the projector casing. Pressure roller 56 has an edge surface 218 that is aligned with and normally biased into engagement with the sound drum surface 204 while pressure roller 57 has a similar surface 220. Stop screw 222 (FIG. 10) is adjusted so that there is a gap of about .010″ between roller surface 220 and drum surface 204. The guide wire 190, acting on the opposite edge of the film, tends to hold the film in contact with the sprocket drum surface 184 during the threading operation only. During projection the film 18 is under tension and it hugs surfaces 204, 182 and 184, thus leaving a clearance between it and the guide wire.

Mounted to the rear of the sprocket structure is a cam 230, the bottom end of which is formed as a lever 232 that extends forwardly and protrudes through the projector casing wall with knob 55 secured at the end hereof. This cam 230 is supported for rotative movement about the axis of the sprocket by studs 234 and 236 that are received in slots 238 and 240 respectively in the cam structure. The cam carries on its edge three cam surfaces, a first surface 242 which acts against the bracket 218 supporting roller 57, a second surface 244 which acts against a stud on the record-playback head support structure, and a third surface 246 which acts against the bracket 214 supporting pressure roller 56. In addition, the cam disc 230 carries a pin 248 which, when the cam disc is fully rotated in the counterclockwise direction as viewed in FIG. 9, engages the film guide wire 190 and lifts it so that the film may be easily released from the sprocket teeth.

In the position shown in FIGS. 9–11 the cam disc is in the sound position with both pressure rollers acting to urge the film into contact with the sound drum surface and the pole piece 208 of the record-playback head also being biased down by spring 250 into engagement with the film on the sound drum surface. Movement of the cam disc in the counterclockwise direction to a position where the arm 232 is directly below the axis of the disc (silent operation) positions the cam surface 244 so that the pole piece 208 of the record-playback head and the erase head 212 are lifted from engagement with the film so that the projector may be operated in the silent mode. Full movement of the cam disc in the counterclockwise direction brings the other two cam surfaces 242, 246 into engagement with the brackets and pin 248 acts against the wire 190, lifting these structures away from the sound drum surface and permitting access to the film that is engaged by the sprocket teeth. This movement also urges pressure roller 57 against the stud 252 which is carried by the movable portion 36 of the output film guide. As indicated above, that film guide portion is pivoted at its upper end and this movement opens the space between the fixed guide portion 39 and the movable guide portion 36 so that access to the film in that area may be had. As guide 36 pivots to open, the edge 254 of the slot through which sensing wire 256 of switch 258 protrudes, pushes against wire 256 and moves it out of the slot, so that the film may be removed or inserted at will.

Details of the configuration of the record-playback head mounting structure is shown in FIGS. 12–15. That support structure 34 is mounted on a shaft 280 that extends outwardly from the wall of the projector casing 10. A collar portion 282 fits over the shaft 280 and a bushing 284 and threaded stud 286 secure the support head casting on this shaft 282. Spring 250 has one end engaged on pin 290 that is secured to the casing wall and the other end acting above the stud 292 on the support casting so that the spring 250 acts to bias the head in a direction of clockwise rotation (as viewed in FIG. 9) about the shaft 280. On the opposite side of the casting there is a tab 294 which carries a stud 296 and a lock nut 298. This bottom of the stud engages a tab 300 that forms a part of the projector casing wall and this mechanism provides an adjustable limit of the rotation of the support casting so that the pole piece 208 supported thereon may be accurately positioned parallel to the stripe 206 (FIG. 8). This is known as the "bearing" or "facing" adjustment.

For proper sound reproduction the sound head and particularly pole piece 208 must be accurately adjusted relative to the sound track. This sound head mounting permits the following adjustments in addition to the "facing" adjustment: Tangency; azimuth; pressure. These adjustments permit the pole pieces 208 to be precisely aligned relative to the sound stripe of the film. For proper operation the gap between the pole pieces should be at a point exactly tangent to the curvature of the sound drum (tangency adjustment) or loss of signal will result. Further, the plane of the pole pieces should be parallel to the sound stripe (azimuth adjustment) or there will be some loss of high frequency signals, and the pole piece surface should be exactly parallel (in the plane perpendicular to the direction of movement of the film) for proper sound sensing (facing adjustment). Also, the pressure of the pole piece on the film should be adjustable within a working range so that there will be adequate contact with the sound track while preventing the pole piece from contacting the sound drum physically. These and other adjustments are provided by the structure shown in FIGS. 12–15.

As indicated above, the sound head structure has a main support plate which is pivotally mounted on shaft 280. The spring 250 which acts against studs 292 to bias the main support structure downwardly in a clockwise direction as viewed in FIG. 13 about the shaft 280 also provides a force for biasing the structure outwardly. The distance of the sound head structure from the projector casing is adjusted by the threaded bushing 284 which cooperates with shaft 280 and the lock screw 286 which provides a lock when the proper position has been achieved.

Supported within this main support structure is a second support member 310 which is mounted on two pivot screws 312, 314 that are aligned on an axis at the center of the pole pieces so that this second plate 310 may be pivoted about that axis to provide a tangency adjustment. The pivotal position of this intermediate plate 310 is controlled by a tangency spring 316 which tends to pivot the plate 310 in a clockwise direction as viewed in FIG. 13. Counterbalancing spring 316 is the tangency adjust screw 318 permitting adjustment and locking of support plate 310 relative to the axis defined by pivot screws 312, 314.

Secured to the plate 310 is a bracket member 320 which has a flat upper surface mated against the lower surface of the plate 310 and secured thereto by a stud 322 that has a threaded lower portion 324 and a central bearing portion 326 so that the bracket member 320 may be rotated relative to the plate 310. This stud 322 provides an azimuth pivot which is vertically aligned with the gap of pole piece 208. Along the pivot axis to the rear thereof is provided an azimuth lock screw 330 which has a washer 332 under its head and is threaded into the bracket member 320. This azimuth lock screw passes through an enlarged bore in the plate 310 so that a degree of rotation about the azimuth pivot is permitted. A hole in the main support immediately above the azimuth lock provides access for tightening the azimuth lock screw 330 when the bracket structure is properly positioned so that the pole piece is exactly parallel to the sound stripe on the film.

Carried by the bracket member 320 is a sound head support structure 340 in which the sound head 210 is secured by conventional means. This support member has a flat upper surface and a rearwardly extending arm 342 which is received between the arm members 344 of the bracket 320 and pivotally secured there be the conically pointed screws 346, 348 so that the head structure is free to rotate about the pivot defined by those two screws. This pivot axis defined by the screws is parallel to the tangent line between the sound drum and the pole piece. In addition, there is the head stop screw 350 and a pressure adjusting screw 360. The head stop screw 350 has a disc-like portion 352 at its lower end on which a lower surface of the support 340 rests as best seen in FIG. 13. This screw 350 is adjusted until there is a minimum gap (about 0.0005") between pole piece 208 and drum surface 204 (FIG. 8). The pressure adjusting screw 360 is secured in a threaded hole in bushing 364 carried by the plate 310. A sleeve 366 in the lower portion of bushing 364 is biased by the coaction of the stud 360 and spring 368 to provide a pressure adjustment or release for the sound head.

It will be noted that while tangency spring 316 acts against the plate 310 and the cooperating tangency adjust screw 318 precisely controls the rotation of plate 310 about an axis parallel to the axis of rotation of the sound drum and sprocket there is an independent pivotal connection between the support structure 340 and the plate 310 so that if excessive pressure should be applied to the sound head, as for example by a splice in the film, the sleeve 366 would move against the pressure of spring 368 and allow the head to rise, thus alleviating the pressure at that point. Thus the sound head structure permits adjustment of the record-playback head in the several planes in a compact, easily adjusted, and accurately alignable structure.

Figure 16:
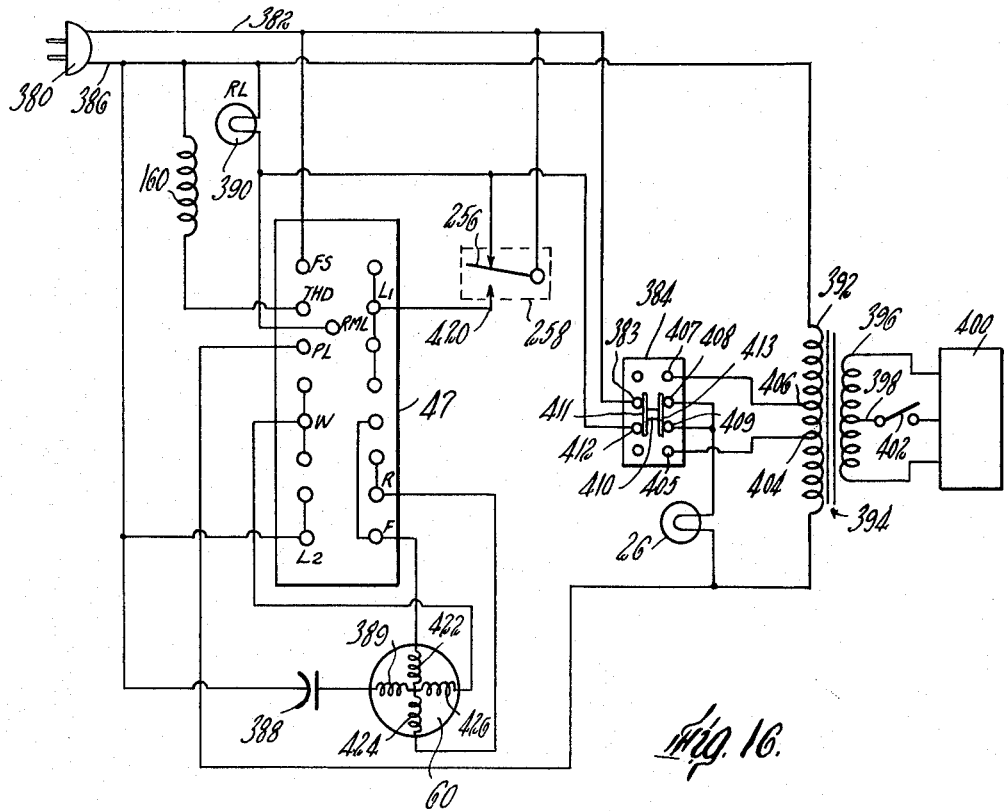
FIG. 16 is a schematic diagram of the electrical circuitry employed in the projector apparatus.
Figure 17:
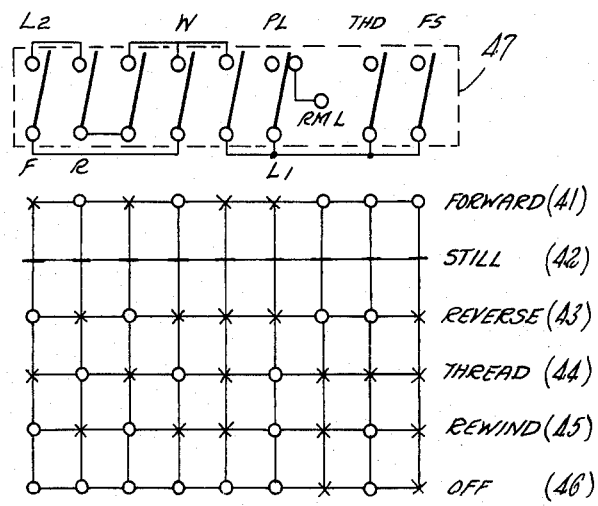
FIG. 17 is a diagrammatic layout indicating the circuit connections resulting from the several possible positions of switch 47.

With reference now to FIGS. 16 and 17, power is supplied to the projector apparatus from a conventional 110 volt supply at standard frequency through a plug connector 380. Supply line 382 has a connection to terminal FS of the slide switch unit 47; a second connection to the common terminal of film sensor switch 258; and a third connection to terminal 383 of the light control switch 384. The second supply line 386 has a first connection to terminal $L_2$ of the slide switch 47 and through capacitor 388 to winding 389 of the drive motor 60; a second connection to the coil of solenoid 160; a third connection to one terminal of a room light circuit indicated generally at 390; and a fourth connection to the primary winding 392 of transformer 394.

The transformer 394 is connected so that its secondary 396 (including center tap 398) supplies a D.C. power supply circuit 400 under the control of switch 402 for energizing the sound amplifier circuitry. The primary winding 392 of the transformer has a tap 404 which provides an 18 volt signal and a tap 406 which provides a 21 volt signal. These taps are connected to terminals 405, 407 respectively of the light control switch 384. Additional terminals 408, 409 are connected to the projection lamp 26.

The light control switch has a control member 410 having two sliders which are movable between a middle position in which the slider shorts the two center terminals toward either end where connection is made between a center terminal and the end terminal. In the intermediate or center position a circuit is completed from line 382 through terminal 383, the left hand shorting slider 411 and terminal 412 through the room light 390 to the line 386 so that the room light line is always energized when the switch is in that position. In either end position this room light circuit is interrupted. At one of the end positions (the upper as shown in FIG. 16) the projection lamp 26 is connected to the higher voltage tap 406 through terminal 407, slider 413 and terminal 408 and at the other end position the lamp 26 is connected to the lower voltage tap 404 through terminal 405, slider 413 and terminal 409. This permits control of the lamp intensity to permit adjustment for slow motion or still viewing as desired or to reduce the lamp intensity so that longer effective life of the film may be obtained.

With reference again to the slider switch 47, one group of four terminals (labeled $L_1$) are connected to normally open contacts 420 of the film sensor switch 258. Two terminals (labeled F) in the same row are connected to winding 422 of the motor, and the remaining two terminals (labeled R) are connected to the opposite winding 424 of the motor. In the second row of slide switch terminals a group of three terminals (labeled W) are connected to winding 426 of the motor. In that same row there is a terminal labeled PL which is connected to the projection lamp 26 and also to a terminal of transformer primary 392. Cooperating with that terminal (which is connected to a normally opened contact (see FIG. 17)) is a terminal (labeled RML) (which is connected to a normally closed contact) and is connected to the room light 390. Finally, the terminal labeled THD is connected to the solenoid coil 160.

This circuitry provides in the slide switch, connected as indicated in the diagram of FIG. 17, control over the film drive operation of the sound projector. When the forward push button 41 is depressed, the four contacts (indicated by X's in the horizontal line) are closed and the other five contacts (indicated by circles) remain open. With the circuitry position shown in FIG. 16 when the forward push button is depressed the motor windings are connected for operation in the forward direction; but no power is supplied to the motor to drive it in the forward direction since no connection is completed to line 382. That required connection exists however when the film sensor switch 258 is operated by the presence of film past the sound head to complete the circuit to contacts 420. This interlock prevents film threading operations when the forward push button is depressed. Rather, the thread push button 44 must be depressed which closes the six contacts as indicated in the diagram of FIG. 17. Circuits from line 382 are completed through terminals FS and THD to energize the solenoid 160 placing the movable loop formers in threading position, and raising the sound head; through terminals FS and RML to maintain the room light circuit energized; and through terminals FS and W to the motor in circuit for operation in the forward direction. When the film has been threaded past the sound drum into the output guide the film sensor element 256 actuates switch 258 to open the normally closed contacts and to close contact 420 to complete a circuit from line 382 to the terminal $L_1$. The presence of film in that position thus completes a circuit that bypasses the contact FS of the slide switch and in this condition the depression of the forward push button will operate the film drive of the projector.

After threading is completed, the depression of the forward push button automatically releases the circuits completed by the depressed thread push button and completes the forward circuits. By this operation the control solenoid 160 is de-energized retracting the loop forming members to their inoperative position out of engagement with the film and lowering the sound head structure into contact with the sound stripe of the film. Also the operation switches from the room light circuit to the projection lamp circuit (from terminal RML to terminal PL). (In the absence of film it will be noted that the room light will remain energized at all times.) When the film is present the projection lamp circuit is completed (for forward operation) and that lamp may be turned on by placing the switch element 410 of the switch 384 in either of the end positions, which operation de-energizes the room lamp and turns on the projection lamp. When the end of the film passes the sensor 258 the room light 390 again is automatically energized. Also should the projector lamp 26 be extinguished by the operation of the lamp switch 384 at any time the room light also will be energized at the same time.

Depression of the still push button 42 does no release any of the circuits completed by the previously depressed push button, but rather only operates a clutch to disengage the film drive circuitry from the motor 60. Should the reverse push button 43 be depressed circuits will be completed (without the film sensor interlock) to display film images while the film is being driven in the reverse direction. (The interlock is not necessary since film cannot be self-threaded when the drive sprockets are operating in the reverse direction.) When the rewind push button 45 is depressed the previously completed circuits are released and the indicated circuits are completed energizing the room light independently of the presence of film or the position of the projector lamp switch, de-energizing the projector circuit and operating the camera motor in the reverse direction (with the high speed drive being operated by the mechanical linkage). Depression of the off push button 46 completes a circuit to room light only.

It will be understood of course that additional circuits may be controlled by the film sensor. For example, solenoid 160 could be automatically de-energized when presence of film was sensed, and/or the projector lamp circuit could be automatically completed. Such a circuit enables an automatic transfer from thread to forward operation in response to film position. In one possible circuit arrangement contact 420 would be connected directly to the projector lamp 26 and the terminal of transformer primary 392 and a normally closed film sensor contact would be employed in series with solenoid 160. The projector lamp and room light terminals in the slide switch could also be eliminated with primary light control being provided by switch 284.

Thus the invention provides improved sound projector apparatus particularly adapted for "self-threading" type of operation for handling eight-millimeter film. The invention provides a simplified film path and sound structure configuration in a compact, economical and easily adjustable unit. An interlock is provided which actuates electrical circuits when the completion of the film threading operation is sensed to enable normal projector operation, which interlock also prevents improper positioning of projector components in a threading operation which might result in damage to the film. The sound head structure is mounted in a manner which permits ready positioning of the sound head between a sound position and a silent position, and a third position in which all components, including thread guides, are released so that the film may be easily removed from the projector. In addition to being compact in design, suitable for use in conjunction with eight-millimeter size film, the sound head structure includes provision for tangency, facing and pressure adjustments so that the proper alignment of the sound head pole piece relative to the film sound stripe may be easily made and accurately made.

While a preferred embodiment of the invention has been shown and described, various modifications thereof will be obvious to those skilled in the art and therefore it is not intended that the invention be limited to the disclosed embodiment or to details thereof and departures may be made therefrom within the spirit and scope of the invention as defined in the claims.

We claim:
1. A motion picture sound projector for use with motion picture film having a sound stripe portion extending along one side thereof comprising a first drive sprocket,
   a fixed film guide adjacent said first drive sprocket defining a film passage entrance to said first drive sprocket,
   a movable loop forming member having a concave downwardly film guiding portion disposed rearwardly of said first drive sprocket,
   said loop forming member being movable between a lower threading position and an upper running position,
   a film gate,
   a projector lamp disposed behind said film gate,
   an aperture in said film gate for passing light from said projector lamp through said film,
   a second movable loop forming member having a concave upwardly film guiding portion,
   said second loop forming member being movable between a threading position and a lower running position and extending from the end of said film gate in a generally rearward direction,
   a second drive sprocket adjacent the terminal portion of said second loop forming member,
   a sound drum mounted coaxially with said second drive sprocket for rotation independently thereof,
   said sound drum including a circumferential surface for supporting the sound stripe portion of the film only,
   an output film guide structure disposed rearwardly of said second drive sprocket to receive film therefrom for guiding to the takeup reel,
   a sound head disposed immediately adjacent said sound drum including a pole piece adapted to be positioned in engagement with the sound stripe of film supported on said sound drum,
   means to lift said sound head and to place said first and second loop forming members in threading position so that film placed in engagement with the teeth of said first drive sprocket is automatically fed by said first drive sprocket through the threading path and across said second drive sprocket and sound drum solely as urged by said drive sprockets in a self-threading operation, film sensor means disposed in said output film guide structure, and means responsive to the sensing of film in said output film guide structure by said film sensor means to lower said sound head into engagement with the sound stripe portion on said sound drum.

2. The motion picture projector as claimed in claim 1 and further including means responsive to said film sensor means to enable normal drive operation of said projector.

3. The motion picture projector as claimed in claim 1 and further including means for biasing said film into engagement with said sound drum and means for simultaneously lifting said sound head and said film biasing means to enable removal of film from said second sprocket.

4. The motion picture projector as claimed in claim 1 and further including
   means responsive to said film sensor means to enable the energization of said projector lamp.

5. A motion picture sound projector for use with motion picture film having a sound stripe portion extending along one side thereof, comprising a drive sprocket having a film support surface and a plurality of teeth for engaging and driving motion picture film,
   projector drive means for rotating said drive sprocket,
   a first upstanding flange adjacent said film support surface on said drive sprocket for engaging and guiding one edge of said film,
   a sound drum mounted coaxially with said drive sprocket for rotation independently thereof,
   said sound drum including a circumferential surface for supporting the sound stripe portion of the film only and an upstanding flange spaced from said sprocket flange for engaging the opposite edge of said film,
   means for adjusting the spacing between said flanges,
   means to bias said film into engagement with said sound drum surface,
   a fly wheel secured to said sound drum for imparting rotational inertia to said sound drum,
   a sound head disposed immediately adjacent said sound drum including a pole piece adapted to be positioned in engagement with the sound stripe of film supported on said sound drum,
   and means to lift said sound head and said film biasing means in coordinated manner to enable removal of film from said drive sprocket.

6. The motion picture projector as claimed in claim 5 wherein said lifting means includes a cam member mounted for rotation about the same axis as said drive sprocket and said sound drum.

7. The motion picture projector as claimed in claim 5 and further including a support structure for positioning said sound head in accurate alignment relative to said sound stripe comprising a first member securing said sound head with said pole piece disposed generally parallel to the direction of movement of said sound stripe past said pole piece,
   a bracket member secured to said first member and mounted so that said pole piece is rotatable about a first axis perpendicular to the direction of movement of said sound stripe and passing through said pole piece,
   a plate member supporting said bracket member,
   said plate member being supported for pivoting movement about a second axis perpendicular to said first axis and parallel to the direction of movement of said sound track,
   a main support structure,
   and means securing said plate member to said main support structure for pivoting movement about said second axis.

8. The motion picture projector as claimed in claim 7 and further including resilient means secured to said plate member and acting to urge said sound head into engagement with said sound stripe and adjustable stop means acting to limit the movement of said sound head in response to the urging of said resilient means.

9. The motion picture projector as claimed in claim 6 wherein said sound head is mounted for pivoting movement on the case of said projector and further including resilient means disposed between said sound head and said projector case acting to pivot said sound head into engagement with said sound stripe and adjustment means including an element secured to said case and an element carried by said sound head support structure acting with said resilient means to control the bearing position of said pole piece relative to said sound stripe.

10. The motion picture projector as claimed in claim 6 and further including adjustable means for moving said sound head in a direction parallel to said drive sprocket axis for properly positioning said pole piece relative to said sound drum support surface.

11. A motion picture projector comprising a drive sprocket for engaging and advancing film and including a flange for engaging one side of the film,
   a sound drum mounted coaxially with said drive sprocket for rotation independently thereof,
   said sound drum having a corresponding flange for engaging the opposite side of the film and a circumferential support surface adjacent said sound drum flange on which the sound stripe portion of the film normally rests.
   means for adjusting the spacing between said drive sprocket flange and said sound drum flange to properly position the film with respect to said support surface,
   a sound head disposed adjacent said sound drum surface having a pole piece adapted to engage the sound stripe portion of said film,
   roller means disposed on either side of said sprocket for guiding film into driving engagement with said sprocket and biasing said sound stripe into engagement with said sound drum surface,
   and cam means disposed adjacent said sound head and said roller means for moving said sound head and said roller means, said cam means having a first position permitting said roller means to resiliently engage film trained over said sound drum surface and said sound head pole piece to be in contact with said film for projector operation in the sound mode,
   a second position in which said rollers and said sound head are moved clear of said sound drum and drive sprocket so that film may be removed therefrom,
   and an intermediate position between said first and second positions where said sound head only is lifted from contact with said film for projector operation in the silent mode.

12. The motion picture projector as claimed in claim 11 and further including film guide means comprising an elongated narrow curved element normally disposed adjacent to but spaced from said drive sprocket flange for guiding film onto said drive sprocket,
   and means carried by said cam means for moving said curved element away from said drive sprocket as said cam means is moved from said first position to said second position.

References Cited by the Examiner
UNITED STATES PATENTS

| | | | |
|---|---|---|---|
| 1,987,406 | 1/1935 | May | 88—16.2 |
| 2,023,065 | 12/1935 | Conrad et al. | 352—29 |
| 2,127,143 | 8/1938 | Ross | 88—16.2 |
| 2,912,519 | 11/1959 | Simmons | 179—100.2 |
| 2,943,860 | 7/1960 | D'Arcy | 274—4 |

JULIA E. COINER, *Primary Examiner.*

WILLIAM MISIEK, *Examiner.*